United States Patent

Nakamura et al.

Patent Number: 5,518,781
Date of Patent: May 21, 1996

[54] STRIPPING FINGERS FOR COPYING MACHINE

[75] Inventors: Kazuyoshi Nakamura; Sadatoshi Inagaki, both of Yokkaichi; Kuniaki Asai; Tadayasu Kobayashi, both of Tsukuba, all of Japan

[73] Assignees: NTN Corporation; Sumitomo Chemical Co., Ltd., both of Osaka, Japan

[21] Appl. No.: 162,469

[22] Filed: Dec. 7, 1993

[30] Foreign Application Priority Data

Dec. 9, 1992 [JP] Japan .................................... 4-329473

[51] Int. Cl.⁶ .................................................. C09K 19/00
[52] U.S. Cl. ...................... 428/1; 252/299.01; 271/307; 271/308; 271/309; 271/310; 271/311; 271/312; 271/313; 271/900; 428/192; 428/195; 428/323; 428/327; 428/421; 428/422; 428/480
[58] Field of Search ............................. 428/1, 480, 192, 428/195, 421, 422, 323, 327; 271/900, 307–313; 355/315; 430/256; 252/299.01

[56] References Cited

U.S. PATENT DOCUMENTS 5,364,670  11/1994  Satoji ......................................... 428/1

OTHER PUBLICATIONS

Abstract of Unexamined Japanese Patent Appl. 3-59067.
Abstract of Unexamined Japanese Patent Appl. 1-81980.
Abstract of Unexamined Japanese Patent Appl. 62-245274.
Abstract of Unexamined Japanese Patent Appl. 63-74084.

*Primary Examiner*—Nasser Ahmad
*Attorney, Agent, or Firm*—Nikaido, Marmelstein, Murray & Oram

[57] ABSTRACT

Stripping fingers for use in a copying machine, molded of a liquid crystal polyester resin composition made up of a liquid crystal polyester having a flow temperature of 340° C. or higher and titanium oxide whiskers. The stripping fingers have excellent heat deflection resistance, heat aging resistance, thermal shock resistance, heat load resistance, low attack on the counter roller, good shape retainability of the finger edges, and good non-stick property against toner. Coating with PFA at 330° C. or higher on the stripping finger increases non-tackiness.

10 Claims, 2 Drawing Sheets

STRIPPING FINGERS FOR COPYING MACHINE

This invention relates to stripping fingers for use in a copying machine.

BACKGROUND OF THE INVENTION

In conventional dry-type copiers, a statically charged latent image formed on a sensitizing drum to represent letters or numbers is converted into a toner image, which is then transferred onto a sheet of paper supplied from a paper feeding cassette, and the toner image transferred onto the paper surface is pressed and heated with a hot fixing roller to fix the image to the paper, thus inseparably fusing the toner image and the paper fibers together.

In order to discharge the paper sheet now carrying the image without getting caught by the fixing roller, the end of paper is scooped up by stripping fingers with their tips pressed tightly against the fixing roller.

Such stripping fingers are required to have a small frictional resistance so that they will not damage the outer peripheral surface of the roller, and to have a sufficient mechanical strength and high-temperature rigidity. Also their edges, especially their edge tips have to be shaped with high accuracy. Further, it is required that toner will not stick to them.

Many of recent copiers are actually not simple copiers but what are called intelligent copiers having high-resolution image processing and editing functions and facsimile function and equipped with input/output devices for use with other office automation machines. Such multi-functioned, complex, systematized copiers are required to operate at higher speed and have a higher reliability and longer life than ordinary copiers.

Thus, high processing speed is an essential requirement for recent copiers. The higher the processing speed, the higher is the heating temperature of the fixing roller. Thus, the stripping fingers have to have a still higher heat resistance. Further, such fingers will be exposed to high temperature for an extremely long time in order to keep the copier turned on so that it can be used at any time. Thus, the stripping fingers are required to have a good heat fatigue resistance.

Further, the stripping fingers are required to follow various operating conditions in multi-functioned copiers. Systematized copiers may be connected with devices which are used in life-or-death situations. High stripping reliability is required for the stripping fingers of such copiers. Namely, the tips of such fingers have to have a high heat load resistance sufficient to endure even in an accident such as paper clogging. Also, their tips have to be shaped so that reliable separation is assured even if the copier is used continuously for a long time.

Conventional stripping fingers are made of polyimide, polyamideimide, polyphenylenesulfide, polyetherketone, polyethersulfone or polyetherimide.

Of these materials, moldings of polyethersulfone or polyetherimide having ordinary heat resistance have a glass transition point of about 220° C. and are amorphous. Since they soften at a temperature above the glass transition point, their heat resistance is too low for the stripping fingers used in high-speed copiers (250° C. or more).

Some resins such as polyethersulfone and polyetherimide have a glass transition point of 250° C. or more. But their lubricity and wear resistance are not good. This may lead to increased torque at the roller driving unit or poor separation. Even if a fluororesin coating is provided, the frictional surface in contact with the roller will wear with long use, so that friction will occur between the substrates of the stripping fingers and the roller.

Thus, poor lubricity and low wear resistance of the substrates lead to shorter life and lower reliability. Moldings of such resins as polyphenylenesulfide and polyetherketone have a glass transition point of less than 250° C. But since they are crystalline resins, they can be reinforced by adding heat-resistant fibers such as glass fiber, potassium titanate fiber, carbon fiber or these fibers plus inorganic powdery fillers such as mica and talc, so that their heat resistance can be increased remarkably. But these materials have problems that the roller can be damaged and that if the reinforcing materials are not properly filled at the edges or tips of the stripping fingers, their resistance to heat deflection deteriorates markedly.

Of the polyimide resins, thermosetting polyimide resins, which can form a three-dimensional network, are brittle and thus require reinforcement with filling materials as with the above-mentioned polyphenylenesulfide resin.

Stripping fingers molded of polyamideimide resin have a heat resistance of 250° C. or more even if reinforcing materials are not used. But they have a problem that their heat resistance deteriorates if they absorb water or moisture. If they absorb a relatively large amount of water, the heat resistance will deteriorate markedly. More specifically, if the molded article is heated at a rapid rate after absorbing water, the water content in it turns into high-pressure steam. It is well-known that if this happens in a molded article larger than a certain size, e.g. a sheet 127 mm long, 12.7 mm wide and 3.2 mm thick, the thickness increases 2.5 microns or more and the lowest temperature at which the surface swelling or foaming happens (what is called the thermal shock temperature) decreases markedly. The heat resistance of an article having a heat resistance of about 280° C. in an absolute dry state will reduce to about 210° C. if it absorbs a large amount of water.

There are known polyimide resins which are thermoplastic polyimides having a very large molecular weight. Such polyimides are commercially available from Du Pont under the trademarks Kapton and Vespel (Registered Trademarks). Although these resins have a high heat resistance, they are not practical because they cannot be made by melt molding such as injection molding.

Other potential candidates are aromatic polyesters, particularly liquid crystal polyesters which are melt moldable and show anisotropy at molten state (e.g. ones disclosed in Japanese Patent Publication 47-47870). This resin shows an orientation peculiar to liquid crystals, and shows self-reinforcement itself. Thus, its own heat deflection resistance is high. It is possible to improve the heat deflection resistance with smaller amounts of reinforcing materials such as inorganic heat-resistant fibrous fillers or powdery fillers. Further, since this material can be reinforced using fibers which are less likely to damage the counter material though their reinforcing effect is low compared with potassium titanate whiskers, attack on the counter material is less severe and brittleness due to oxygen crosslinking, which happens with polyphenylenesulfide resin, scarcely occurs, and heat aging resistance is also good.

Further, there will be no deterioration in the thermal shock temperature due to water absorption, which happens with polyamideimide resin moldings. Thus, those materials disclosed in Japanese Unexamined Patent Publications 62-245274 and 63-74084 have been used heretofore as materials for the stripping fingers. But they are not satisfactory in terms of reliability and longevity.

The surface temperature of the fixing roller in a copier is 150° C. or higher in general and most typically in the range of 170° C.–250° C. Thus, if the finger tips are subjected to an inordinarily large load due to paper clogging or the like, they may creep under high-temperature load. Further, since the self-reinforcement is provided by the liquid crystals, which are rather large units, if they are subjected to stress repeatedly at high temperature, these units tend to collapse, causing a sharp deterioration in the physical properties such as flexural modulus. In other words, the heat fatigue resistance is poor.

One reinforcing material which can improve the high-temperature rigidity, heat fatigue resistance and heat load resistance and which is less likely to damage the roller material is potassium titanate. But its reinforcing effect and the degree of improvements are small. More importantly, a composition of liquid crystal polyester and potassium titanate whiskers is partially gelatinized when molded into stripping fingers by melting. This may lead to the formation of "blisters" on the surfaces of the fingers. If such blisters are present on the surface which contacts the roller, it would become impossible to strip paper sheets from the roller.

Further, the degree of self-reinforcement of the liquid crystal polyester due to its peculiar orientation varies widely. If it is small, its heat distortion temperature will be too low to be acceptable as stripping fingers. Further, if stripping fingers are molded of a liquid crystal polymer, the radius of curvature at their tips tends to be too small compared with those molded of a polyamideimide resin. Some of them will have even less than 10-micron sharp edges. Even if a stripping finger with a favorable radius of curvature at its edge (10–50 microns) is obtained by molding, its edge may be too sharp due to scratches formed on the mold by fillers or the like. Such a finger may suffer heat deflection as a result of reduced high-temperature rigidity. As a result, paper stripping may become difficult or the roller outer surface may be damaged.

On the other hand, numerous proposals have been made to improve the non-stick property of the stripping fingers with respect to toner. For example, it was proposed to form on a stripping finger a coating of fluororesin or fluorinated polyether polymer or to incorporate a non-stick property modifier such as a fluororesin in the material.

One conventional method which aims specifically to improve the non-stick property with respect to toner is to heat tetrafluoroethylene-perfluoroalkylvinylether copolymer (hereinafter abbreviated to PFA) above its melting point to fuse it to the stripping fingers. Since this technique does not use a binder resin (such as epoxy resin, polyimide resin or polyamideimide resin), which is used ordinarily in other techniques, the surface of the coating material solely consists of PFA resin. Thus, its non-stick property is excellent.

But in order to firmly bond the PFA film to the stripping fingers so that the PFA can exhibit its inherent excellent non-stick property, it has to be heated to 330° C. or more. Very few resins can withstand such high temperatures. Even a stripping finger made of a liquid crystal polyester may deflect, shrink or develop blisters on the surface during the heat melting step.

As described above, there has been no stripping finger which has an excellent heat deflection resistance, heat aging resistance, thermal shock resistance, heat fatigue resistance and heat load resistance, which attacks the counter roller less severely, and which has an excellent non-stick property with respect to toner. It has been desired to provide stripping fingers which solve the above said problems and meet the market requirements such as higher quality, higher reliability and longer life.

BRIEF DESCRIPTION OF THE INVENTION

As a result of vigorous efforts to solve these problems, the present inventors have found that stripping fingers molded of a composition comprising a specific group of liquid crystal polyesters and titanium oxide whiskers, and which here either their tips only or their entire surfaces coated with a tetrafluoroethylene-perfluoroalkylvinylether copolymer meet the above requirements.

The liquid crystal polyesters used in this invention have a flow temperature of 340° C. or higher, when measured as described below. These liquid crystal polyester resins turn to an anisotropic molten state above the flow temperature.

Flow temperature is the temperature at which the melt viscosity of a resin is 48000 poise when placed under a load of 100 kgf/cm$^2$ when the resin is melted by heating it at a rate of 4° C./min. and extruded through a nozzle of 1 mm in inner diameter and 10 mm in length.

DETAILED DESCRIPTION OF THE INVENTION

The above-described liquid crystal polyester is synthesized from different kinds of aromatic hydroxycarboxylic acids or their ester-forming derivatives or from an aromatic hydroxycarboxylic acid, aromatic dicarboxylic acid, aromatic diol or their ester-forming derivatives. It has for example the following repeating structural units.

Repeating structural units derived from aromatic hydroxycarboxylic acid:

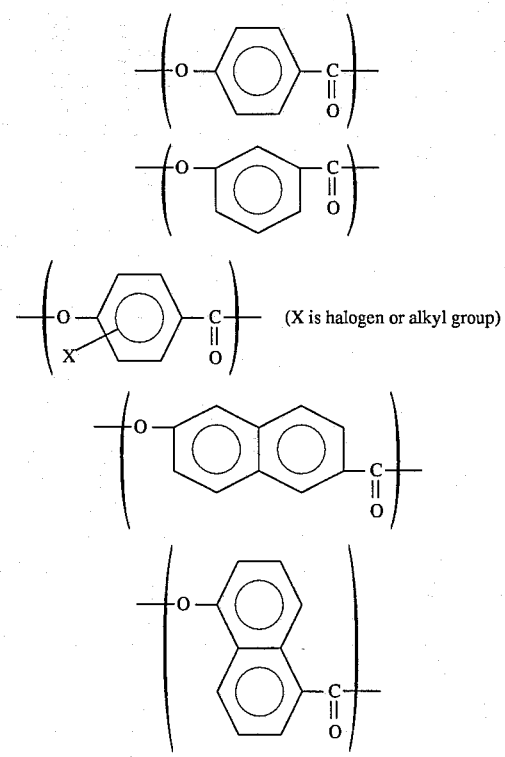

Repeating structural units derived from aromatic dicarboxylic acid:

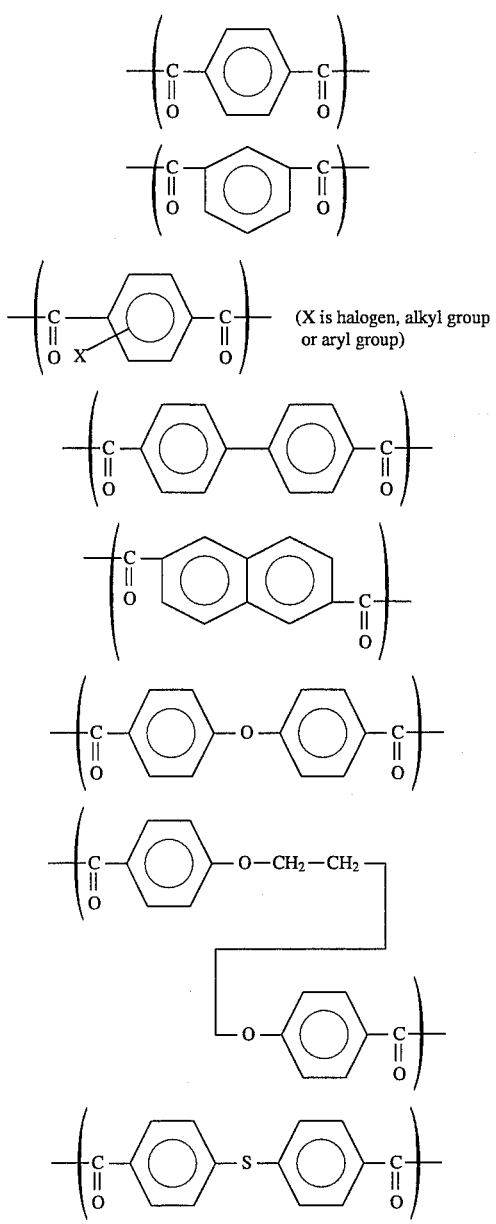

Repeating structural units derived from aromatic diol:

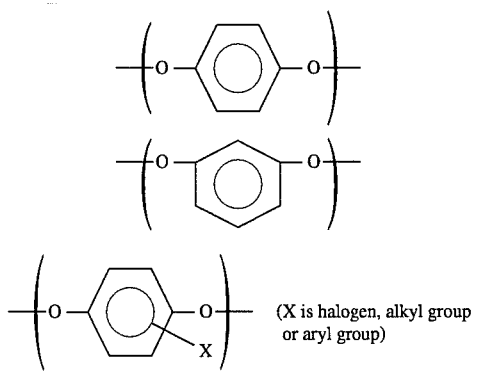

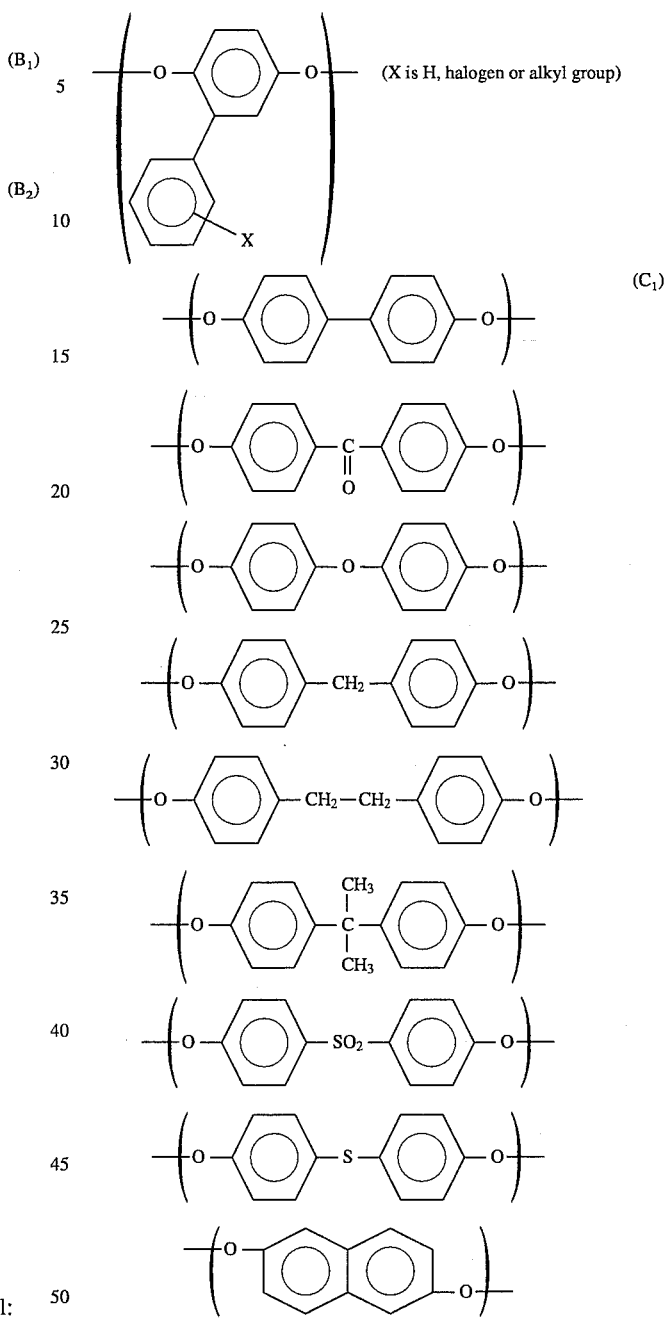

Liquid crystal polyesters having repeating structural units as shown by the following formulas (A), (B) and (C) are especially preferable as materials for stripping fingers in that they have good heat resistance, mechanical properties and moldability in a balanced manner.

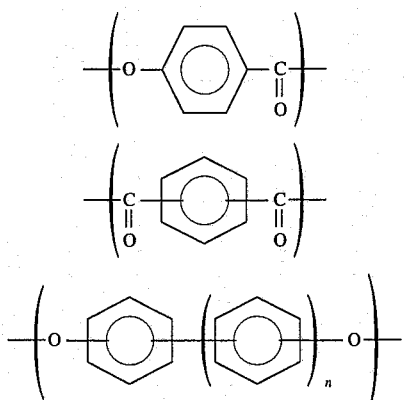

(In the formulas, n represents 0 or 1, the molar ratio (A):(B) is 1:1 to 10:1. The molar ratio (B):(C) is 9:10 to 10:9. Aromatic substituents in (B) and (C) are arranged in para- or meta-positions relative to one another.)

The titanium oxide whiskers used in this invention are rutile type white needle-like crystals expressed by the chemical formula $TiO_2$ and having an average fiber diameter of 0.05–µm, preferably 0.05–0.5 µm, and an average fiber length of 1–100 µm, preferably 1–30 µm.

Such titanium oxide whiskers may be formed by any method, e.g. by well-known sulfuric and chloric methods. E.g. FTL series manufactured by Ishihara Sangyo Co., Ltd. may be used.

In order to further improve the reinforcing effect of the titanium oxide whiskers, it is effective to improve the wettability and bond strength between the titanium oxide whisker and the liquid polyester as the matrix by treating the surface of the whiskers with a coupling agent. The coupling agent used for this purpose may be silicon, titanium, aluminum, zirconium, zirco aluminum, chromium, boron, phosphorus or amino acidic agent.

Titanium oxide whiskers should be added to the liquid crystal polyester in a ratio of 5–50%, preferably 10–40% weight with respect to the total amount of the liquid crystal polyester and the titanium oxide whiskers.

Graphite, which can improve the thermal conductivity and thus the non-stick property with respect to toner, may be added to the liquid crystal polyester composition in the ratio of 5–30 percent by weight. If less than 5%, the graphite could not improve the non-stick property. If more than 30%, it will have a bad influence on the melt moldability of the fingers.

In addition to titanium oxide whiskers and graphite, one or more heat-resistant fibers, which can withstand the molding temperature for liquid crystal polyester (normally 300°–400° C.), may be added in such an amount that will not impair the object of this invention. Heat-resistant fibers include aluminum borate whiskers, glass fiber, carbon fiber, graphite fiber, ceramic fiber, rock wool, slag wool, potassium titanate whiskers, silicon carbide whiskers, sapphire whiskers, wollastonite, steel wires, copper wires, stainless steel wires, silicon carbide fiber and aromatic polyamide fiber.

Further, it is possible to improve the elastic modulus by adding aluminum borate whiskers. They are white needle-like crystals expressed by the formula $9Al_2O_3 \cdot 2B_2O_3$ or $2Al_2O_3 \cdot B_2O_3$ which have an average fiber diameter of 0.05– 5 µm and an average fiber length of 2–100 µm. Especially preferable aluminum borate whiskers are ones expressed by the formula $9Al_2O_3 \cdot 2B_2O_3$. One of such whiskers is commercially available under the name of Alborex Y manufactured by Shikoku Chemicals.

One or more of the following substances may be added together with the abovesaid heat-resistant fibers: additives such as antioxidants, heat stabilizers, ultraviolet absorbers, lubricants, release agents, coloring agents, flame-retardants, flame-retardant assistants, antistatic agents and crystallization promoters which are added to ordinary resin compositions, wear resistance improvers (such as carborundum, quartzite powder, molybdenum disulfide and fluororesin), tracking resistance improvers (such as silica), and other fillers (substances which are stable at 300° C. or over such as glass beads, glass balloons, calcium carbonate, alumina, talc, diatomaceous earth, clay, kaolin, gypsum, calcium sulfite, mica, metallic oxides, inorganic pigments), agents for imparting thixotropic properties such as fine silica powder, fine talc and diatomaceous earth, and polyether oil and organopolysiloxane in order to increase and stabilize its self-reinforcing properties, and heat resistant amorphous polyether resins.

Before using the stripping fingers, they are preferably subjected to annealing for 15 hours at 150°–340° C. in order to eliminate strains created during molding and to improve theirs dimensional stability while being used at high temperatures. Also, as will be described hereinafter, the annealing may be carried out during baking after applying PFA resin to the stripping fingers.

In order to impart good non-stick properties to the edges or entire surfaces of the stripping fingers, a PFA coating is provided. When baking, the coating is melted to form a continuous PFA coating layer at least on the surfaces of the fingers. Commercially available PFA resins include PFA-X500CL made by Du Pont-Mitsui Fluorochemicals. Such a coating material may be applied to the molded article by spray coating, dip coating, electrostatic coating or powder coating.

The temperature at which the PFA coating is baked to the stripping fingers should be higher than the melting point of the PFA resin, preferably 330°–400° C. By conducting the heat-melt treatment at a temperature of 330° C. or higher, a superficial layer of the PFA will melt sufficiently so as to turn it into a filmy state. Thus, the coating exhibits excellent non-stick property and adheres strongly to the stripping fingers. If the treatment is at a temperature which is higher than 400° C., the stripping fingers might be deflected markedly. The thickness of the PFA film is preferably 5–40 microns. If thinner than 5 microns, the wear resistance is insufficient. A film thickness of 40 microns or larger might have a bad influence on the dimensions of the edge tips of the stripping fingers.

It is also desirable to add reinforcing materials, lubricants, etc. to a fusing type PFA resin coating material so as to increase its wear resistance. Further, in order to prevent static electrification, antistatic agents such as carbon black may be added. Also, in order to increase the bond strength between the stripping fingers and the PFA resin, the surfaces of the stripping fingers may be subjected beforehand to tumbling (barrel tumbling) or shot blasting.

The striping fingers molded of a liquid crystal polyester resin composition comprising a liquid crystal polyester having a flow temperature of 340° C. or higher and titanium oxide whiskers exhibit an increased rigidity and mechanical strength at high temperatures due to the additional of titanium oxide whiskers. Thus, their heat load resistance and heat fatigue resistance at high temperatures improve greatly (especially at a temperature of 200° C. or higher). The fingers thus made can keep the radius of curvature of their edges at a desired level for a prolonged period of time. They never develop too sharp edges. High impact resistance makes them highly reliable stripping fingers which can work for a long period of time.

Further by forming a perfectly continuous PFA resin coating on the edge or entire surface of each stripping finger by baking at 330° C. or higher, the amount of toner adhering to the stripping fingers can be reduced because of its non-stick property. This prevents paper surfaces from being soiled with toner.

The stripping fingers according to the present invention have excellent self-reinforcing properties, heat aging resistance and thermal shock resistance, which are inherent to liquid crystal polyester, as well as excellent heat fatigue resistance, heat load resistance, high impact resistance and impact fatigue resistance. Further, attack on the counter roller can be reduced to a minimum and the shape retainability at the tips is high. Thus, reliability is high especially in continuous use at high temperatures. The stripping finger is useful in applications where long life is expected. Further, a perfectly continuous PFA resin coating is formed at least on the edge surface by melting the resin at 330° C. or higher. Due to the high non-stick property of PFA, the amount of toner that sticks to the stripping fingers can be reduced. Thus paper surfaces are less likely to be soiled with toner. Such stripping fingers can be used not only for a device having only a copying function but for what is called an intelligent copier having high-resolution image processing, editing and facsimile functions and equipped with input and output devices for connection with other office automation machines.

Other features and objects of the present invention will become apparent from the following description taken with reference to the accompanying drawings, in which:

Figure 1:
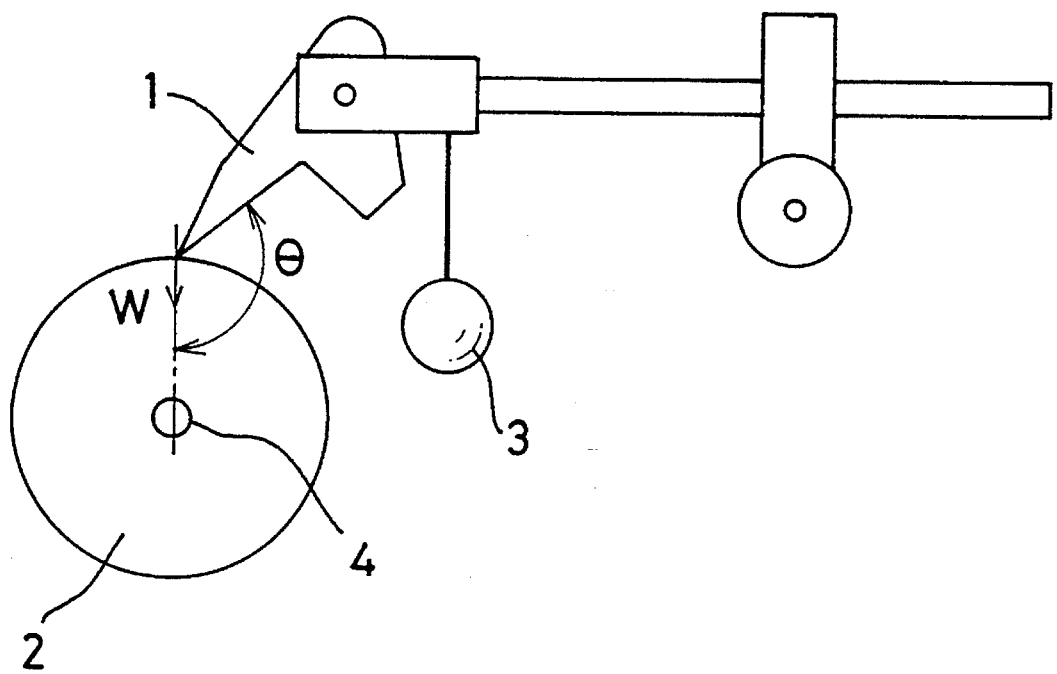
FIG. 1 is a schematic side view of a heat deflection tester.

The materials used in the examples and the comparative examples are shown below, in which (A), ($B_1$), ($B_2$) and ($C_1$) represent the repeating units of the above-described liquid crystal polyesters.

(1) liquid crystal polyesters liquid crystal polyester ①: contents ratio (molar %) A:$B_1$:$C_1$=50:25:25, flow temperature as measured with the above-mentioned Koka type flow tester (SHIMADZU): 375° C. Liquid crystallization starting temperature: 385° C.

liquid crystal polyeter ②: contents ratio (molar %) A:$B_1$:$B_2$:$C_1$=50:20:5:25, flow temperature: 352° C. Liquid crystallization starting temperature: 364° C.

liquid crystal polyeter ③: contents ratio (molar %) A:$B_1$:$B_2$:$C_1$=60:15:5:20, flow temperature: 323° C. Liquid crystallization starting temperature: 340° C.

(2) whiskers titanium oxide whiskers (Ishihara Sangyo: FTL 300) aluminum borate whiskers (Shikoku Chemicals: ALBOREX Y) potassium titanate whiskers (Titan Kogyo KK: HT 300)

(3) graphite graphite (Nippon Kokuen: ACP)

Examples 1–4, Comparative Examples 1–3

After dryblending the materials in the ratios shown in Table 1, the mixture was supplied into a twin-screw melt extruder (Ikegai Iron works: PCM-30) and granulated by kneading and extruding with a screw revolving speed at 150 rpm. The pellets thus produced were injection molded at an injection pressure of 600 kgf/cm² mold temperature 180° C. to mold test pieces 127 mm long, 12.7 mm wide and 6.4 mm thick for flexural test and test pieces having the same shape as stripping fingers used in a copier FX-2700 by FUJI XEROX. The cylinder temperatures of the twin-screw melt extruder and the injection molding machine were 380° C. and 390° C., respectively, for the composition containing liquid crystal polyester ① (Example 3), 360° C. and 370° C., respectively, for the composition containing liquid polyester ② (Examples 1, 2 and 4 and Comparative Examples 1 and 2), and 340° C. and 350° C., respectively, for the composition containing liquid polyester ③ (Comparative Example 3).

In order to examine the degree of damage to the counter roller, a coating primer liquid (Du Pont-Mitsui Fluorochemicals: MP-902AL) was applied to these test pieces by spray coating and dried, and a PFA coating liquid (Du Pont-Mitsui Fluorochemicals: X500CL) was applied thereon by spray coating. The test pieces were then heated for 30 minutes at 340° C. to fuse the coatings.

Their water absorption, flexural strength, flexural modulus, Izod impact strength and heat distortion temperature were measured. The results are shown in Table 2. As for the test pieces in the shape of stripping fingers, the radius of curvature at the edge tips, high-temperature rigidity, heat fatigue resistance, heat load resistance, high impact resistance and impact fatigue resistance were measured. Also, the external appearance on the surfaces of the stripping fingers were evaluated for the blisters. The results are shown in Table 3. The above measurements and evaluations were made in the following manners.

(Measurements of physical properties)

(1) Flow temperature: measured with a flow tester CFT-500 type capillary rheometer made by Shimadzu. Namely, the resin heated at a rate of 4° C./min. was extruded through a nozzle 1 mm in inner diameter and 10 mm in length under a load of 100 kgf/cm² and the temperature was measured when the melt viscosity reached 48000 poise.

(2) Water absorption: The test pieces for flexural test were dried for 15 hours at 150° C. and then immersed in 23° C. water for 200 hours. The changes in weight after this test were regarded as water absorptions.

(3) Flexural strength, flexural modulus: Test pieces for flexural test (127×12.7×6.4 mm) were prepared and measured under ASTM D-790. Flexural modulus was measured not only at room temperatures but at 250° C.

(4) Izod impact strength: Each of the flexural test pieces was divided in half and measurements were made for these halves under ASTM D-256.

(5) Heat distortion temperature (HDT): Measurements were made for flexural test pieces under ASTM D648.

(6) Liquid crystallization starting temperature: A resin powder was placed on a heating stage of a polarization microscope and heated under a crossed nicol at a rate of 10° C. per minute. The temperature was measured when the resin melted and the amount of transmitted light increased. If not melted completely under normal pressure, the measurement was made with the resin under spring pressure.

(Evaluation of the stripping fingers)

(1) Radius of curvature at the edge tips

A projector V-16D made by Nicon was used. The values shown are the range between the maximum value and the minimum value when n equals 100. But the values smaller than 5 microns were all regarded as 1 micron because such small values cannot be measured with high accuracy.

(2) High-temperature rigidity according to the shapes of the striping fingers

Figure 2:
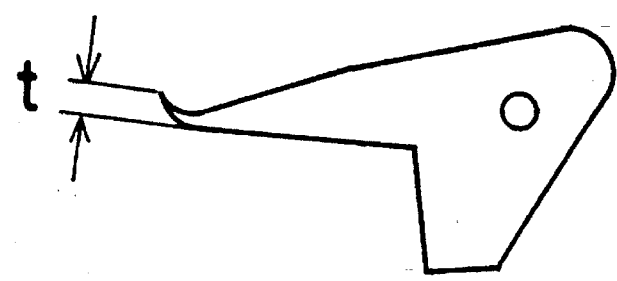
FIG. 2 is a side view showing the amount of deflection at the edge of the stripping finger.

A tester for heat deflection at the edge tips of the stripping fingers (shown schematically in FIG. 1) was used to measure the amounts of deflection t (see FIG. 2) with the contact time set at 1 minute, load (W) on the edge tips of stripping fingers 1 being 20 grf, contact angle (θ) 100° degrees and the surface temperature of roller 2 varied among 210° C., 240° C. and 270° C. (n=10). Then their average was calculated.

(3) Heat fatigue resistance according to the shapes of the stripping fingers

The same tester as used in the high-temperature rigidity test was used to measure the amounts of deflection t (see FIG. 2) with the surface temperature of the roller 2 set at 240° C., load (W) on the edge tips of the stripping fingers 1 at 20 grf, contact angle (θ) of 100 degrees, and contact time varied among one minute, 30 minutes and one hour (n=10). Then their average was calculated.

(4) Heat load resistance according to the shapes of the stripping fingers

The same tester as used in the high-temperature rigidity test was used to measure the amounts of deflection t (see FIG. 2) with the surface temperature of the roller 2 set at 240° C., load (W) on the edge tips of the stripping fingers 1 varied among 20 grf, 40 grf and 100 grf, with the contact angle (θ) set at 100 degrees and contact time of one minute (n=10). Then their average was calculated.

(5) Evaluation of external appearance of the "blisters" on the surfaces of the stripping fingers The surface conditions of the stripping fingers were evaluated to distinguish those having "blisters" on the surfaces from those having no blisters.

(6) High impact resistance of the stripping fingers

Figure 3:
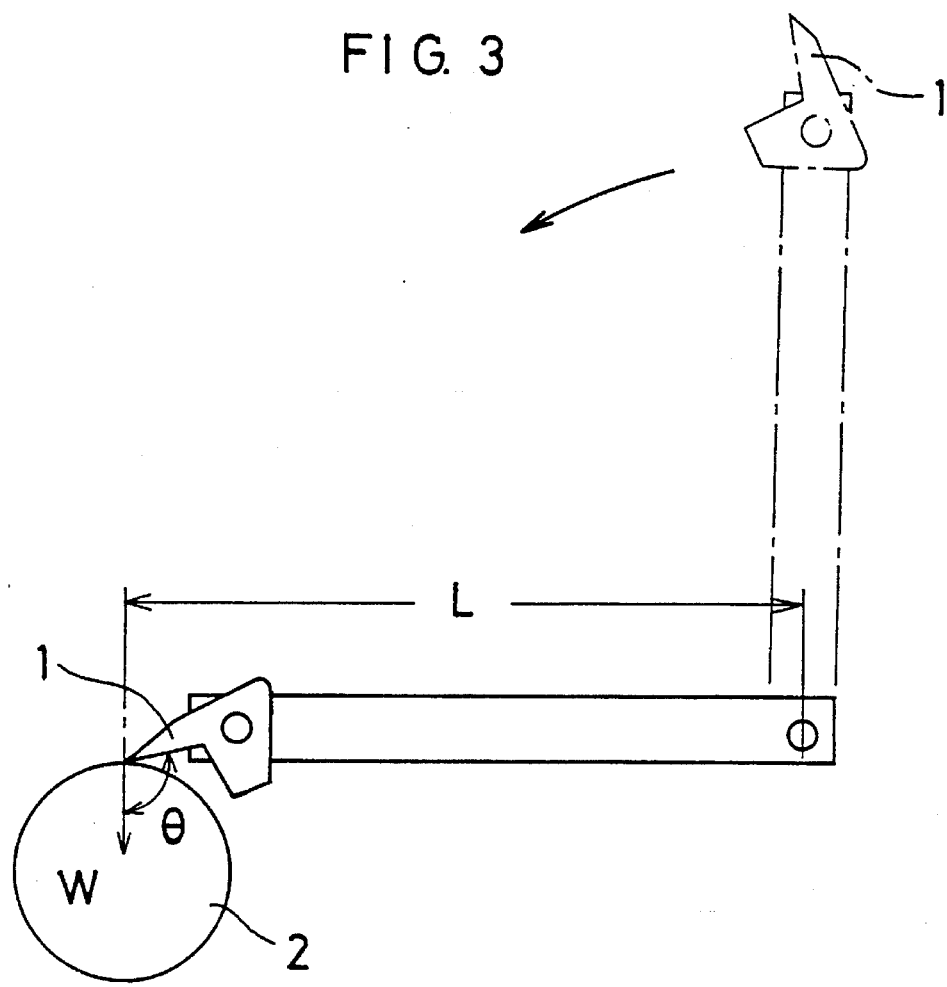
FIG. 3 is a schematic side view of a high impact resistance tester.

The high impact resistance at the tip of the edge of each stripping finger was measured with a high impact resistance tester (shown schematically in FIG. 3).

Each stripping finger 1 was mounted on one end of a lever (having a length L=85 mm) which is pivotable about the other end. In this state, the lever was pivoted to its upright position and released to allow it to swing by gravity until the finger collides with a roller 2. The roller, the finger 1 and the lever were positioned so that the edge tip of the finger 1 will collide with the roller 2 at a contact angle (θ) of 100° under the load (W) of 20 grf. The number of times the lever was swung until the stripping finger 1 sustained damage was measured. The upper limit of such number was set at ten.

(7) Impact fatigue resistance of the stripping fingers

Figure 4:
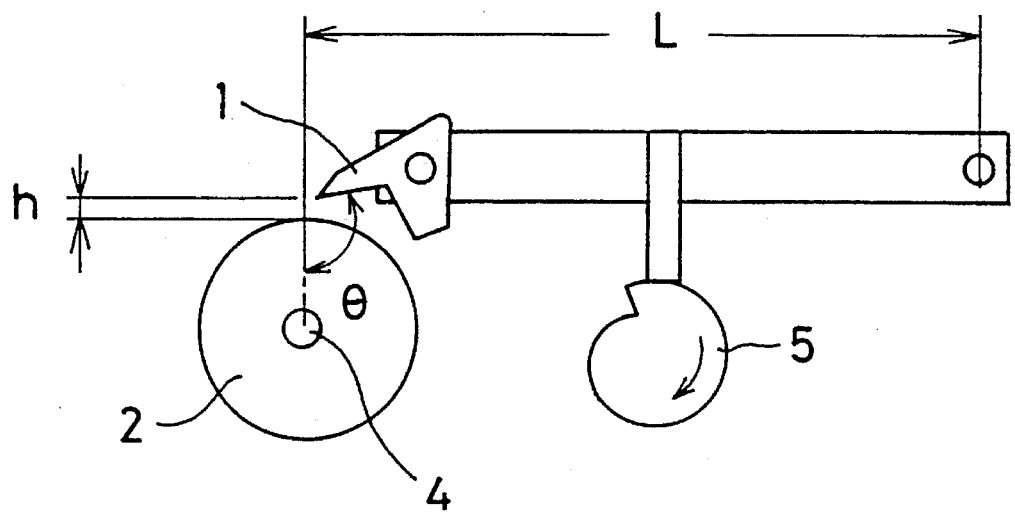
FIG. 4 is a schematic side view of an impact fatigue resistance tester.

The impact fatigue resistance at the tip of the edge of each stripping finger was measured with an impact fatigue resistance tester (shown schematically in FIG. 4). Each stripping finger 1 was mounted on one end of a lever which is pivotable about the other end. In this state, the finger was intermittently dropped freely from the height of 1 mm until it collides with a roller 2 heated to 200° C. by rotating a cam 5 kept in contact with the underside of the lever. The finger 1 was positioned so that its edge tip collides with the roller 2 at a contact angle (θ) of 100° under the load (W) of 20 grf. The average amount of deformation t at the finger tip (see FIG. 2) after bringing the finger into collision with the roller 100000 times (n=10) was measured.

It is apparent from the results on Table 2 that the compositions comprising liquid crystal polyesters ①, ② having flow temperatures of 350° C. or more and titanium oxide whiskers and the compositions comprising the above-mentioned ingredients plus aluminum borate whiskers (Examples 1–4) showed a high flexural strength, high flexural modulus (250° C.) and high HDT.

On the other hand, the composition consisting only of liquid crystal polyester ② (Comparative Example 1) was low in flexural modulus of elasticity. Also, the composition comprising liquid polyester ② and potassium titanate whiskers (Comparative Example 2) was low in Izod impact strength. The composition comprising liquid crystal polyester ③ whose flow temperature is lower than 340° C. and containing titanium oxide whiskers (Comparative Example 3) showed a sharp deterioration in flexural modulus at 250° C. HDT was 300° C. or lower.

As will be apparent from the results (measured values) shown in Table 3, in Examples 1–4, the radii of curvature of the edges of the stripping fingers were accurate and they showed excellent values in high-temperature rigidity, heat fatigue resistance, high impact resistance and impact fatigue resistance. Comparative Examples 1 and 3 were not satisfactory in terms of the accuracy of the radius of curvature of the edge of the stripping fingers, high-temperature rigidity, heat fatigue resistance, heat load resistance and impact fatigue resistance, though they were sufficiently resistant to high impact. They became useless as stripping fingers because their tips deflected easily under short-term low load at high temperature. In Comparative Example 2, the high impact resistance and the accuracy of the radius of curvature at the edges of the stripping fingers were too low to be used as stripping fingers. Further, in Comparative Examples 2 and 3, "blisters" developed on the surfaces when they were coated with PFA.

TABLE 1

| Material | Number | Example | | | | Comparative example | | |
|---|---|---|---|---|---|---|---|---|
| | | 1 | 2 | 3 | 4 | 1 | 2 | 3 |
| Liquid crystal polyester ① | | — | — | 70 | — | — | — | — |
| Liquid crystal polyester ② | | 70 | 60 | — | 60 | 100 | 70 | — |
| Liquid crystal polyester ③ | | — | — | — | — | — | — | 70 |
| Titanium oxide whiskers | | 30 | 20 | 30 | 30 | — | — | 30 |
| Aluminum borate whiskers | | — | 20 | — | — | — | — | — |
| Graphite | | — | — | — | 10 | — | — | — |
| Potassium titanate whiskers | | — | — | — | — | — | 30 | — |

TABLE 2

| Evaluation item | Number | Example | | | | Comparative example | | |
|---|---|---|---|---|---|---|---|---|
| | | 1 | 2 | 3 | 4 | 1 | 2 | 3 |
| Water absorption rate (%) | | <0.02 | <0.02 | <0.02 | <0.02 | <0.02 | <0.02 | <0.02 |
| Flexural strength | | 1660 | 1780 | 1500 | 1450 | 1380 | 1460 | 1830 |

TABLE 2-continued

| Evaluation item | Number | Example | | | | Comparative example | | |
|---|---|---|---|---|---|---|---|---|
| | | 1 | 2 | 3 | 4 | 1 | 2 | 3 |
| (kgf/cm$^2$) | | | | | | | | |
| Flexural modulus | Room temp. | 178000 | 233000 | 184000 | 175000 | 125000 | 152000 | 182000 |
| (kgf/cm$^2$) | 250° C. | 64000 | 87000 | 73700 | 63000 | 39000 | 54000 | 49000 |
| Izot impact strength (kgf · cm/cm) | | 55 | 45 | 34 | 30 | 90 | 20 | 70 |
| Heat distortion temperature[HDT] (°C.) | | 315 | 324 | 350 | 327 | 295 | 320 | 277 |

TABLE 3

| Evaluation item | Number | Example | | | | Comparative example | | |
|---|---|---|---|---|---|---|---|---|
| | | 1 | 2 | 3 | 4 | 1 | 2 | 3 |
| Radius of curvature at edge tips (μm) | | 10~30 | 10~30 | 10~30 | 15~30 | 1~40 | 5~30 | 5~30 |
| High temp. rigidity (μm) | 210° C. | 14 | 15 | 13 | 16 | 30 | 18 | 29 |
| | 240° C. | 17 | 23 | 16 | 24 | 45 | 27 | 34 |
| | 270° C. | 23 | 25 | 22 | 27 | 55 | 30 | 42 |
| Heat fatigue resistance (μm) | 1 min. | 15 | 16 | 14 | 17 | 50 | 23 | 41 |
| | 30 min. | 23 | 30 | 21 | 31 | 80 | 37 | 53 |
| | 1 hour | 27 | 31 | 25 | 33 | 95 | 42 | 57 |
| Heat load resistance (μm) | 20 grf | 18 | 22 | 16 | 23 | 45 | 30 | 34 |
| | 40 grf | 25 | 26 | 23 | 27 | 70 | 44 | 50 |
| | 100 grf | 38 | 39 | 37 | 39 | 110 | 49 | 87 |
| High impact resistance | | 10 | 5 | 4 | 4 | 10 | 1 | 10 |
| Impact fatigue resistance | | 150 | 100 | 200 | 230 | 400 | 300 | 450 |
| Blister on the surface of stripping fingers | | NO | NO | NO | NO | NO | YES | YES |

What is claimed is:

1. Stripping fingers for a copying machine and comprising at least one stripping finger molded of a composition comprising a a liquid crystal polyester having a flow temperature of 340° C. or higher, said flow temperature being the temperature at which the melt viscosity of a resin is 48000 poise when the resin is melted by heating it at a rate of 4° C./min, and extruded through a nozzle of 1 mm in inner diameter and 10 mm in length under a load of 100 kgf/cm$^2$, and about 5 to 50% by weight of whiskers consisting essentially, of titanium oxide based on the total amount of liquid crystal polyester and titanium oxide whiskers, having an average fiber diameter of about 0.05 to 3 μm and an average fiber length of about 1 to 100 μm.

2. Stripping fingers as claimed in claim 1 wherein said liquid crystal polyester has the repeating structural units expressed by the following formulas (A), (B) and (C):

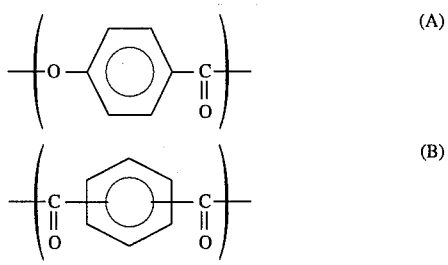

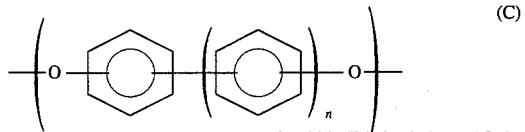

(wherein n is 0 or 1, the molar ratio (A):(B) is 1:1 to 10:1, the molar ratio (B):(C) is 9:10 to 10:9, and the aromatic substituent groups in (B) and (C) are located in para- or meta-positions with respect to each other).

3. Stripping fingers as claimed in claim 1 or 2, wherein at least the surfaces or edges of said stripping fingers are coated with tetrafluoroethylene-perfluoroalkylvinylether copolymer.

4. Stripping fingers as claimed in claim 3, comprising tips having radii of curvature of a tip of an edge thereof is about 10 to 50 μm.

5. Stripping fingers as claimed in claim 1, substantially completely coated with tetrafluoroethylene-perfluoroalkylvinylether copolymer.

6. Stripping fingers as claimed in claim 3, wherein said coating is about 5 to 40 μm thick.

7. The stripping fingers according to claim 1 wherein said titanium oxide whiskers comprise about 10 to 40 weight percent thereof.

8. The stripping fingers according to claim 1 wherein said whiskers have a coating of at least one member selected from the group consisting of silicon, titanium, aluminum, zirconium, zirco aluminum, chromium, boron, phosphorus, and amino acid thereon prior to being admixed with said polyester.

9. The stripping fingers according to claim 1 additionally containing about 5 to 30 weight percent graphite fibers.

10. The stripping fingers according to claim 1 additionally containing at least one member selected from the group consisting of aluminum borate whiskers, glass fibers, carbon fibers, graphite fibers, ceramic fibers, rock wool, slag wool, potassium titanate whiskers, silicon carbide whiskers, sapphire whiskers, wollastonite, steel wires, copper wires, stainless steel wires, silicon carbide fibers, and aromatic polyamide fibers.

* * * * *